(12) United States Patent
Rouge et al.

(10) Patent No.: US 9,494,403 B2
(45) Date of Patent: Nov. 15, 2016

(54) MOTORIZED INCLINABLE MEASURING HEAD

(71) Applicant: TESA SA, Renens (CH)

(72) Inventors: Claude Rouge, Baulmes (CH); Eric Meyer, Yens (CH); Benjamin Vullioud, Vufflens-la-Ville (CH)

(73) Assignee: TESA SA, Renens (CH)

( * ) Notice: Subject to any disclaimer, the term of this patent is extended or adjusted under 35 U.S.C. 154(b) by 178 days.

(21) Appl. No.: 14/564,931

(22) Filed: Dec. 9, 2014

(65) Prior Publication Data

US 2015/0176958 A1     Jun. 25, 2015

(30) Foreign Application Priority Data

Dec. 24, 2013   (EP) .................................... 13199535

(51) Int. Cl.
*G01B 5/012*     (2006.01)
(52) U.S. Cl.
CPC .................................... *G01B 5/012* (2013.01)
(58) Field of Classification Search
CPC ...... G01B 5/012; G01B 5/016; G01B 7/012; G01B 7/016
USPC .................. 33/556, 557, 558, 559, 560, 561
See application file for complete search history.

(56) References Cited

U.S. PATENT DOCUMENTS

| 5,647,137 | A | * | 7/1997 | McMurtry et al. .... G01B 5/012 33/572 |
| 6,546,643 | B2 | | 4/2003 | Lotze et al. |
| 6,854,195 | B2 | | 2/2005 | Jordil et al. |
| 7,213,344 | B2 | | 5/2007 | Jordil et al. |
| 7,263,780 | B2 | | 9/2007 | Jordil et al. |

FOREIGN PATENT DOCUMENTS

| EP | 0 070 108 A1 | 1/1983 |
| EP | 0 392 660 A2 | 10/1990 |
| EP | 0 501 710 A1 | 9/1992 |
| EP | 1 126 237 A2 | 8/2001 |
| EP | 1 443 299 A1 | 8/2004 |
| EP | 1 666 832 A1 | 6/2006 |
| EP | 1 666 833 A1 | 6/2006 |
| WO | 2006/079794 A1 | 8/2006 |

OTHER PUBLICATIONS

Extended European Search Report dated Feb. 28, 2014 as received in Application No. 13199535.9.

* cited by examiner

*Primary Examiner* — R. A. Smith
(74) *Attorney, Agent, or Firm* — Maschoff Brennan (57) ABSTRACT

An articulated measuring head for orienting a probe relatively to a measuring apparatus, including Hirth couplings for providing a high-resolution indexing to two orthogonal rotors and an advanced guiding system to ensure a precise rotation control when the Hirth couplings are free and accurate indexing when they are clamped together. The articulated head of the invention has an embedded dynamic controller using high-precision encoders and crash detection by capacitive sensors.

12 Claims, 7 Drawing Sheets

MOTORIZED INCLINABLE MEASURING HEAD

REFERENCE DATA

The present claims priority from European Patent Application EP13199535.9 of Dec. 24, 2013, the contents whereof are hereby incorporated by reference in their entirety.

FIELD OF THE INVENTION

The present invention concerns, in embodiments, the field of accessories for coordinate position and measuring systems and notably, but not exclusively, an articulated motorized head designed to be used on a machine for measuring coordinates, preferably of the automatic programmable type.

RELATED ART

Touch probes and scanning probes are measuring instruments that are used in combination with coordinate measuring machines (CMM) for example in production lines of mechanical components, for measuring and checking dimensions and surface state of machine parts. Touch and scanning probes are also used to capture the three-dimensional shape of complex pieces in order to model or reproduce them. Probes generally comprise a measuring head, designed to be fastened onto the arm of a measuring machine and a mobile feeler, comprising a sphere at the end of an elongated rod and designed to be brought into contact with the piece to be measured.

In most applications, touch probes are fastened on the mobile arm of a machine whose position in space can be determined accurately by means of a manual or automatic measuring system, such as for example position encoders placed on the axes of the machine. The mobile arm is moved in space to bring the probe's measuring feeler into contact with the piece or surface to be measured. During contact, a deflective force is then applied on the feeler, moving it away from its initial resting position. A sensor reacts to the slightest displacement of the feeler, generating an electric signal that is sent either to the user, in the form of a light signal, or to the machine's control software which thus determines, on the basis of the data of the measuring system, the coordinates of the contact point within a given reference frame. For this purpose, the prior art uses electromechanical or optical sensors or movement sensors based on different principles, for example sensors comprising constraint gauges.

It is also known to use, in combination with CMMs, non-contact probes or vision sensors, to capture optically the coordinate and dimension of mechanical parts. Such non-contact probes can be based on laser interferometers, triangulation, or any other suitable contactless measuring method.

In some applications, advanced machining centres can likewise be equipped with coordinate or vision probes, with the aim of measuring coordinates of mechanical pieces during, or immediately after, the machining operations.

When the probe is used for measuring pieces of complex shape, having cavities and protuberances, it is difficult or even impossible to bring the feeler into contact with the entire surface of the piece without the fixed part of the measuring head or the feeler's rod interfering with elements of the piece to be measured. To remedy this inconvenience, articulated measuring heads are known that allow the contact feeler to be oriented in a plurality of directions in space. Generally, two independent rotation axes are required to cover all the possible orientations. An instrument of this type is described in European patent application EP0392660.

The ability of changing the inclination of the probe may also allow reducing the motion of the CMM, thus improving the measuring speed, and approaching the measured surface along the most favourable trajectory. Articulated head may be manually actuated but, when measuring complex pieces, it is desirable that the measuring head be motorized in order to orient the probe feeler automatically, upon command from the measuring machine's control program. For this purpose, the rotating and the locking of the feeler's axes are performed by electromagnetic actuators, for example engines or servomotors that move the indexing surfaces away and imprint a rotation to the axes that allow changing the probe's inclination automatically according to a predetermined sequence.

There are also known examples of articulated heads in which the articulations are indexed, in the sense that a sufficiently large but finite number of predetermined and accurately reproducible resting positions are provided, or capable of continuous rotation. The indexing of the feeler's rotation axes is achieved by indexing surfaces that engage mutually and define the desired resting positions, for example by a crown of spheres in which three pins engage. Examples of this type of indexing mechanism are presented in European patent applications EP1443299 and EP1666832.

One limitation of the known motorized heads, particularly of those of the indexed type, but also shared in part by those of the continuous variety, is that when the head is unlocked, determining precisely the angular position of the individual articulation is difficult. This uncertainty can lead to unwanted collisions (crashes) between the probe, or the head, and the workpiece.

Another limitation lies in the fact that the actuation and locking system can be negatively influenced by the inertia and imbalance of the probe feeler, particularly when, as it frequently happens, the measuring probe is mounted on the tip of a long extension.

Further, there is a difficulty in providing an indexed articulated head that offers a fine resolution, that is to say, a large number of precisely defined indexed angles. As the number of angular stop increases, in fact, the dimension of the indexing surfaces must necessarily decrease, which leads to higher manufacturing costs.

The decrease of the indexation step comes at the price of longer and more complex calibrations, since the number of configurations that must be calibrated and tested is higher. It is also observed that when the articulated head is locked, the angle at which it sets is not necessarily always equal to the nominal predetermined value. There is also a need of providing indexed articulated heads that, when locked, set themselves precisely into the same positions, thus improving the precision of the measure and alleviating the need of periodical calibrations.

Known motorized articulated heads are controlled in general by an external control unit, which is usually placed near the controller of the CMM and is connected to receive and transmit control signals by a suitable cable. Given the substantial size of coordinate measuring machines and the necessity of providing long stretches of slack cable to accommodate all the possible movements of the head, the length of cable can be very considerable, reaching or exceeding 50 meters in some cases. Such long connections limit the accuracy of signals that are transmitted, especially analog ones, as well as the signal transmission speed. The controller also powers the probe head.

BRIEF SUMMARY OF THE INVENTION

It is an aim of the present invention providing an improved articulated head with a high number of indexed configuration that is more precise and whose setting are more accurately repeatable that the devices of the prior art.

Another aim of the present invention is the provision of an articulated measuring head allowing a better control of the rotor's motion when unlocked.

Further, the present invention proposes an articulated measuring head that is less sensitive to the inertia of the accessories than the heretofore known devices.

According to the invention, these aims are achieved by means of the object of the appended claims.

In the following description, the terms 'above', 'below', 'vertical', and other similar wording are used with reference to a conventional orientation of the articulated head of the invention, as it is represented in the drawings. It is important to realize, however, that the articulated head of the invention can be used in any orientation in space and that these terms are used only to improve the readability of the description, no limitation to the invention being implied.

BRIEF DESCRIPTION OF THE DRAWINGS

The invention will be better understood with the aid of the description of an embodiment given by way of example and illustrated by the figures, in which.

DETAILED DESCRIPTION OF POSSIBLE EMBODIMENTS OF THE INVENTION

Figure 1:
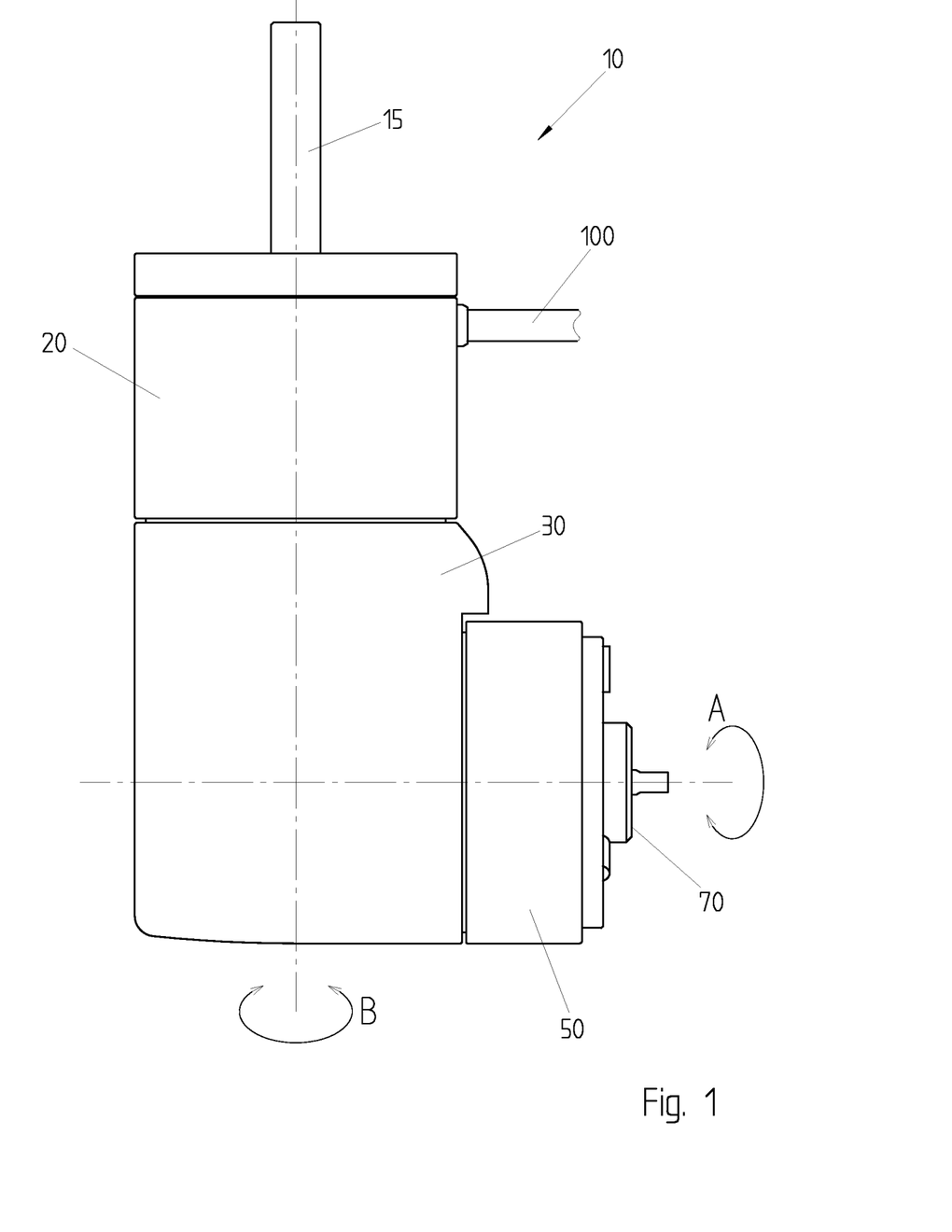
FIGS. 1 and 2 illustrate schematically an articulated head according to an aspect of the present invention.
Figure 2:
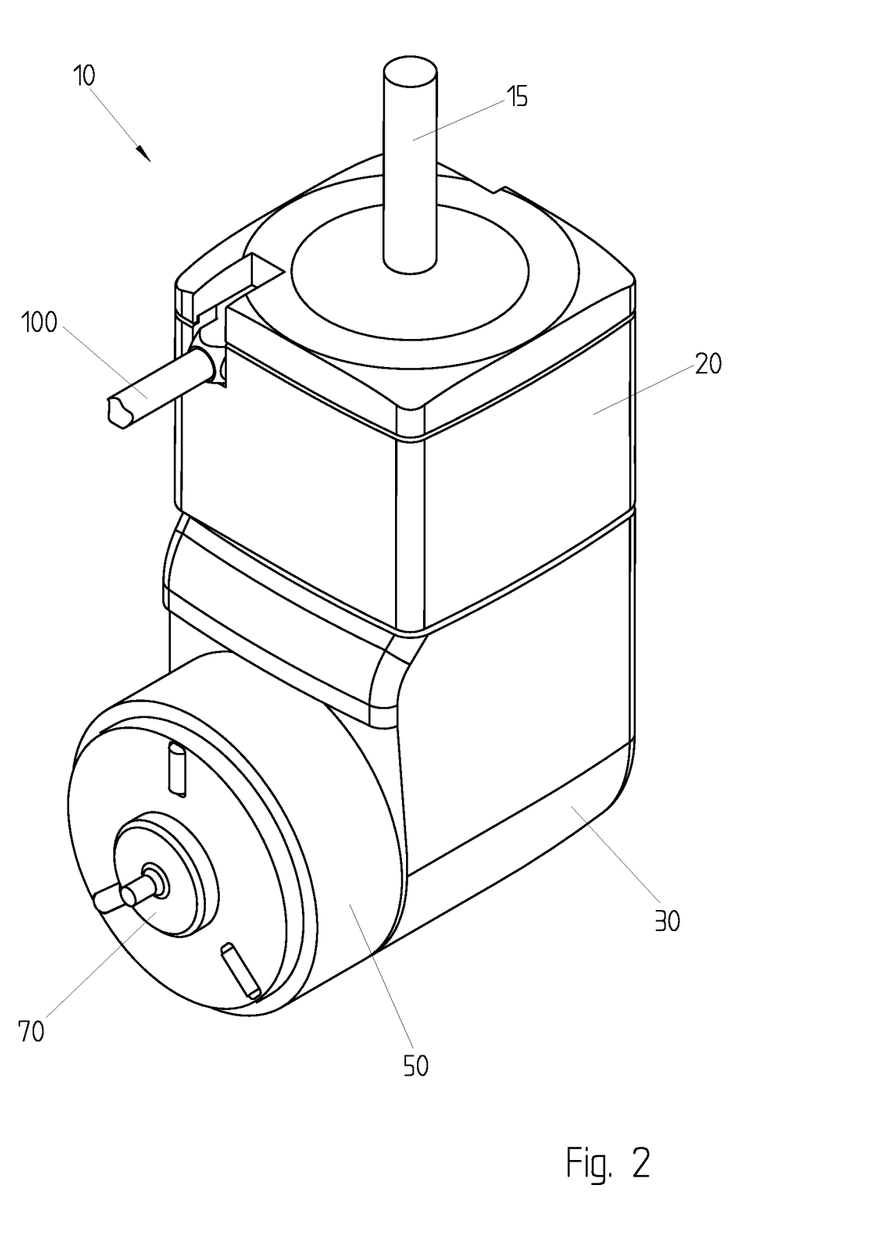

The articulated head 10 of the invention could assume, in embodiments a structure as depicted in FIG. 1 which shows a threaded rod 15 suitable for connecting a support element of the articulated head 10 the head to a movable platform of a coordinate measuring machine, for example a platform that can be moved according the three coordinate axes XYZ within a given measure space. It goes without saying that the threaded rods could be replaced in a perfectly equivalent manner, by another suitable fastening means.

The support element 20 is therefore, in operation, firmly attached to a mobile platform of a coordinate machine, or another similar positioning system. The first mobile element or rotor 30 is rotatably connected to the support 20 and is capable of turning about the vertical axis 'B'. As it will be seen in the following, the first mobile element 30 can be set in a locked state, in which it is firmly set in one of a plurality of indexed angular positions, or in an unlocked state, wherein it can rotate about the 'B' axis. Locking, unlocking, and rotation of the mobile element 30 are determined by suitable automatic actuators inside the articulated head.

This particular embodiment of the invention comprises a second mobile element or rotor 50 rotatably connected to the first mobile element 30 and capable of turning around a second rotation axis 'A', orthogonal to axis 'B' (hence horizontal in the drawing). The second mobile element is also settable in a locked state or in an unlocked state as the first one. In the represented variant, a common actuator sets both first and second rotors 30 and 50, such they can only be locked and unlocked at the same time, but it would be conceivable to arrange two independent actuators allowing selective and separate locking and unlocking actions. Once unlocked, the rotors 30 and 50 can preferably turn independently around the respective axes under the action of separate actuators.

The second rotor 50 carries a connection element 70 for coupling a measuring tool, for example a touch probe, a scanning probe, a noncontact measuring tool like a laser probe, or a camera, or any other suitable measuring means.

Figure 3A:
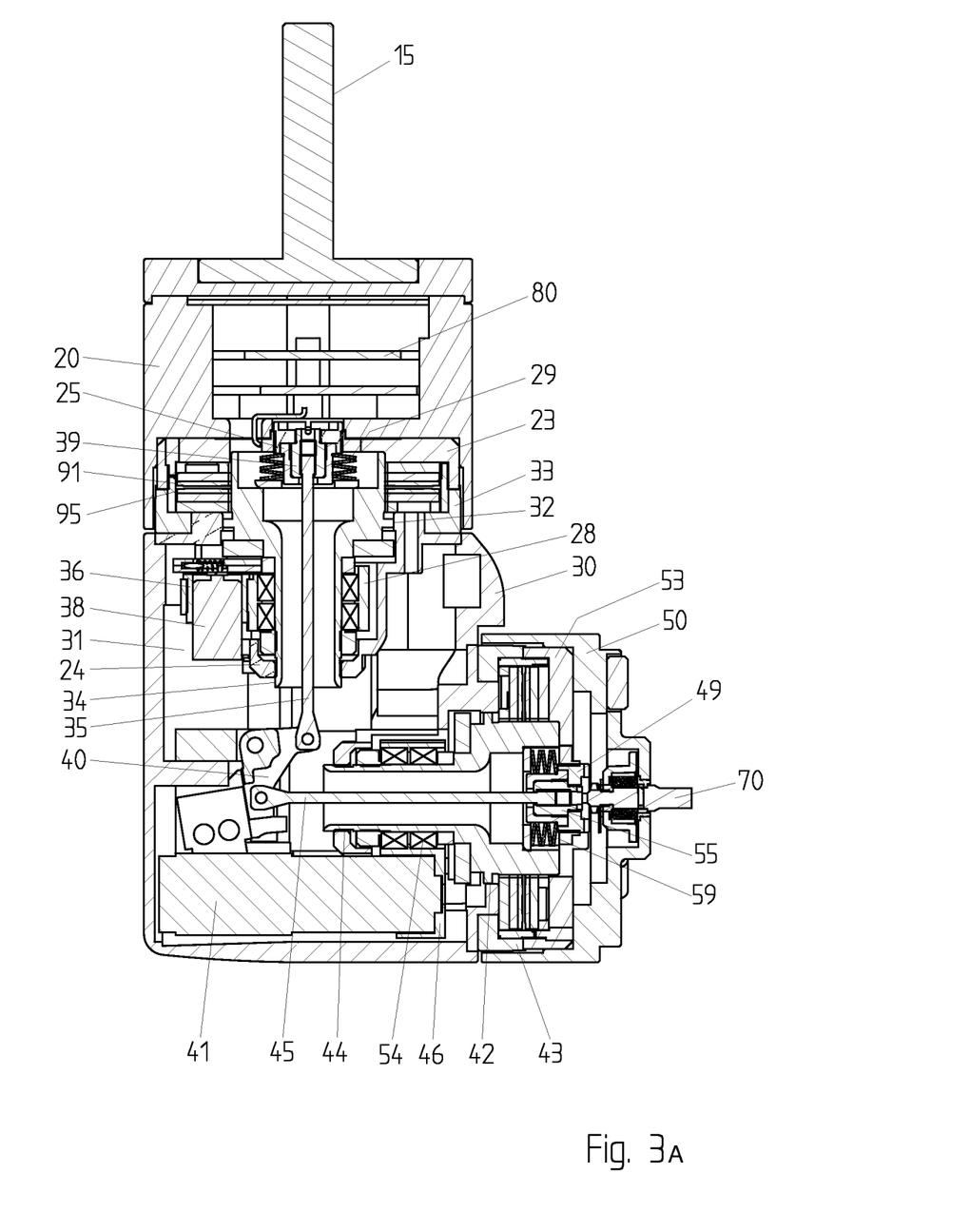
FIG. 3A is a section view of the articulated head of FIG. 1 in the locked state.
Figure 3B:
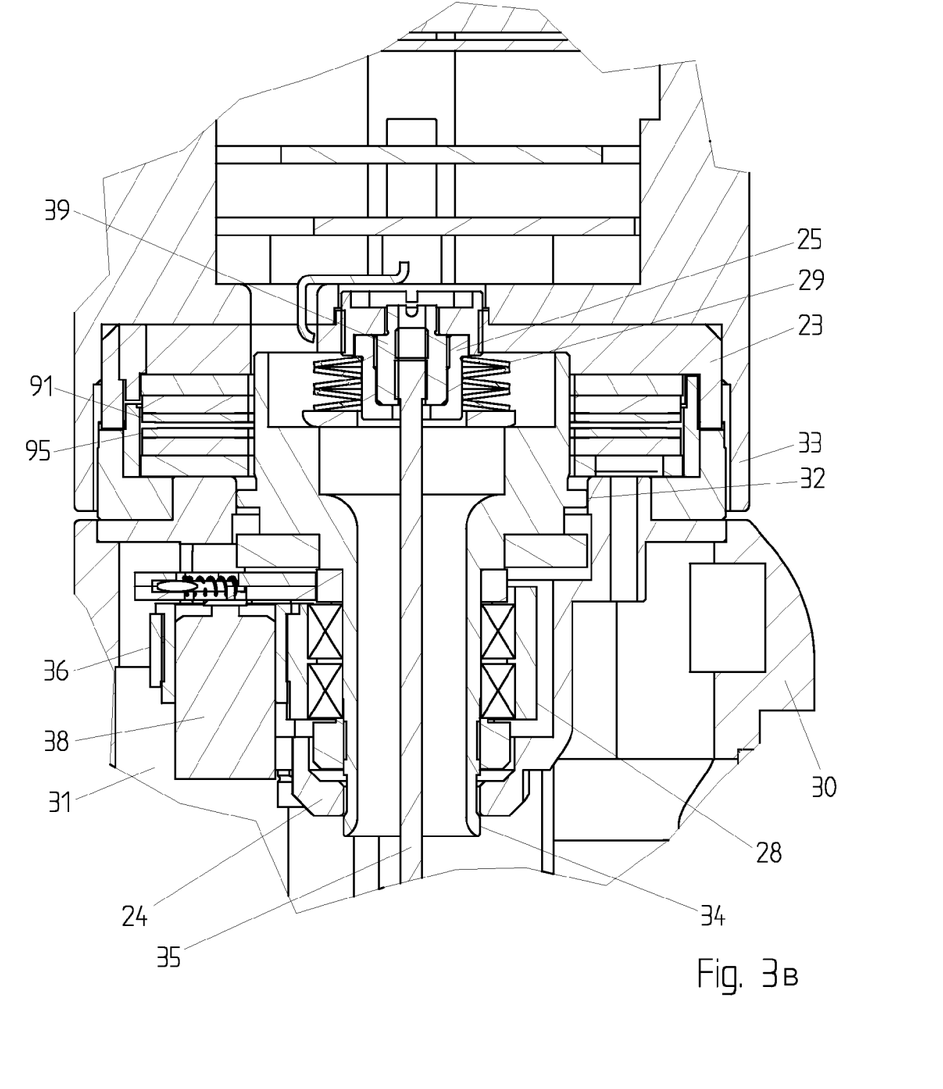
FIG. 3B is an enlarged view of the previous figure showing details of the guiding and locking mechanism according to the invention.
Figure 4:
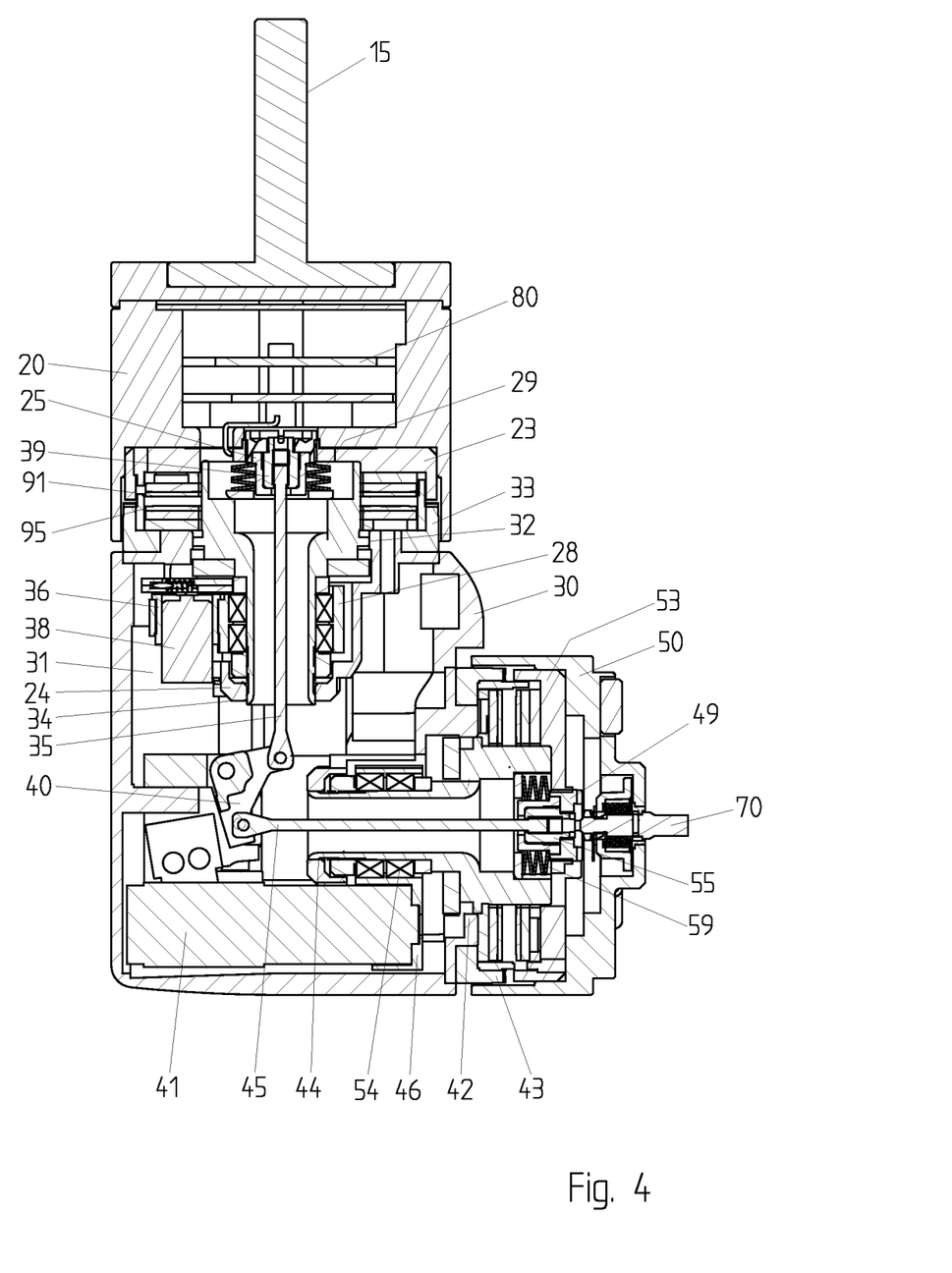
FIG. 4 shows, in section the articulated head of FIG. 1 in the unlocked state.

FIGS. 3A, 3B, and 4 show in section the articulated head of the invention with the rotors in the locked, respectively unlocked state. The support element 20 encompasses an axle 24, protruding downwards towards the first rotor 30 that defines the rotation axis 'B' of the first rotor 30 that is in fact connected to the axle 24 by a first plain bearing 32 close to the upper end of the axle 24 and a second plain bearing 34 further down along the axle 24. Importantly the bearings are arranged such as to allow both rotation and axial sliding, within set limits, of the rotor 30 relative to the axle. Thus the rotor 30 can be pulled away from the support element 20 when it is desired to unlock and rotate it, or pushed against the support element to lock it and prevent its rotation. The plain bearings 32 and 34 could be replaced by another suitable bearing system allowing both rotation and sliding.

The locking and unlocking action of the first rotor is provided by the rod 35 running axially inside the axle 24 that is hollow and that is linked to the lever 40 which is in turn operated by a suitable automatic actuator, such as an electric motor, not visible in the figure. In a first position, as represented in FIGS. 3A and 3B, the rod 35 is in tension and pulls down the plug 39 in the socket 25 which is in turn supported by the spring 29. The net effect being that the rod 35 pushes the first rotor 30 against the support 20 thereby locking it in place. The locking force is determined by the stroke of the rod 35 and the elastic constant of the spring 29 and is typically of about 100 N.

On the other hand, when the lever 40 is moved in the position visible in FIG. 4, the tension of rod 35 decreases, spring 29 is no longer in tension, and rotor 30 is allowed to move away from the support such that it can be rotate around axis 'B'. It's worth noting that the unlocking action is independent from the direction of gravity force. If in fact the articulated head were mounted with the support element 20 in the lowest position, the push force of the rod 35 would be enough to positively lift the rotor from the support.

A precise indexed position of the rotor 30 relative to the support is obtained because the parts of the rotor and of the support that enter in contact in the locked state have a plurality of interlocking positioning elements that engage together to define a plurality of predefined indexed orientations.

Preferably, as in the example of the figures, the support has a set of fixed positioning elements 23 and the first rotor a set of mobile positioning elements 33 consisting in two rings of tapered intermeshing teeth on the lower face of the support 20 respectively on the upper face of the rotor 30. Such an arrangement is known as a Hirth coupling and can be machined to very high accuracy to provide, for example, indexed positions with an angular step considerably finer that 5°, for example 2.5°, 2°, or lower. With respect to the isostatic six-point couplings traditionally used in articulated probe heads, accurate Hirth couplings offer highly precise indexing and a very rigid coupling when clamped together. Other indexable couplings are however possible.

According to an important aspect of the invention, the lower bearing 34 has, when the rotor is locked, a higher play than the upper bearing closer to the plane of the Hirth coupling. Also, the upper bearing 32 has a larger diameter than the lower bearing 34. In this manner, the indexed positions are entirely determined by the self-centring properties of the Hirth coupling and any error due to tolerances of the axle 24 and bearings 34 and 32 is eliminated.

Figure 5:
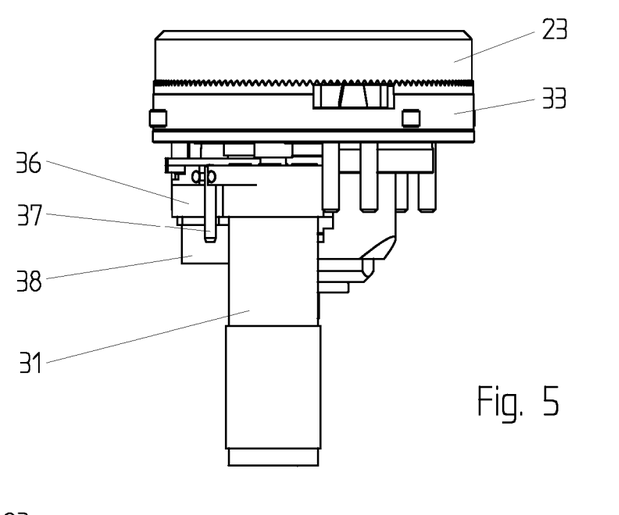
FIG. 5 shows the actuator ensuring the rotation of one rotor in the head of the preceding figures. Several components have been removed to improve readability.

In the unlocked state, the rotation of the rotor 30 is assured by the electric motor 31 that acts on a fixed gear fastened to the axle 24 and in this manner moves together with the rotor 30 when it is actuated. Preferably, the motor 31 is not rigidly fastened in a fixed position inside the rotor, but rather mounted on a motor support element 36 that is rotatably mounted on the axle 24 by means of the ball bearings 28. The motor support element 36 is connected to the rotor 30 by a sliding joint formed, in the example of the figures, by the pin 37 of the rotor 30 sliding in a suitable opening of the support 36.

Preferably the sliding joint has a determined level of play in the locked position. In this manner, the motor 31 is essentially decoupled from the rotor 30 when it is locked. Therefore, the indexing accuracy and the rotor is not altered and the setting of the rotor into the indexed position does not imply undue stress on the motor 30 and its drivetrain. On the other hand, when the rotor is unlocked, the sliding pin 37 allows driving the rotor 30 into rotation with a minimal slack.

The motor support also carries an angular digital encoder 38 driven by suitable transmission elements, thus allowing the determination of the angular position of the rotor 30 relative to the support element 20. Preferably, the encoder has a precision of 0.1° or better.

In a manner similar to what described above for the first rotor 30, the second rotor 50 is connected to the axle 54 which is supported by plain bearings 42 and 44, the former close to the indexation plane determined by the Hirth coupling 43, 53 and the latter, with a higher play, farther off. The locking of second rotor 50 happen simultaneously as that of the first rotor 30 by the second arm of lever 40, rod 45, plug 49, socket 55, spring 59. As it was the case above, the locking action is independent from gravity.

Rotation of the second rotor is assured by a second servomotor 41 mounted on a second support element that is arranged 46 similarly as the first support element 36 in order not to alter the precision of the Hirth coupling. A second encoder is also provided for reading the angular position of the second rotor 50 relative to the first one 30, but it is not visible in the figure.

The articulated head of the invention also comprises a programmable electronic control unit 80 that is responsible for driving the actuators that lock and unlock the rotors 30, 50 and set them in rotation.

According to an important aspect of the invention, the programmable control unit, also indicated as PCU, is operatively arranged to move the rotors 30 and 50 in such a manner that they are precisely aligned with one indexed position before clamping the Hirth couplings together. It has been observed that, although Hirth couplings are engineered to set always in the same indexed positions, accuracy can be increased and wear of the coupling surfaces avoided by allowing them to close only when the respective teeth are well aligned better than a fraction of the indexing step. To achieve this desirable manner of functioning, an encoder that can give the position of the rotor with a resolution considerably better than the indexing step (for example lower than 5% of the indexing step) is important.

Figure 7:
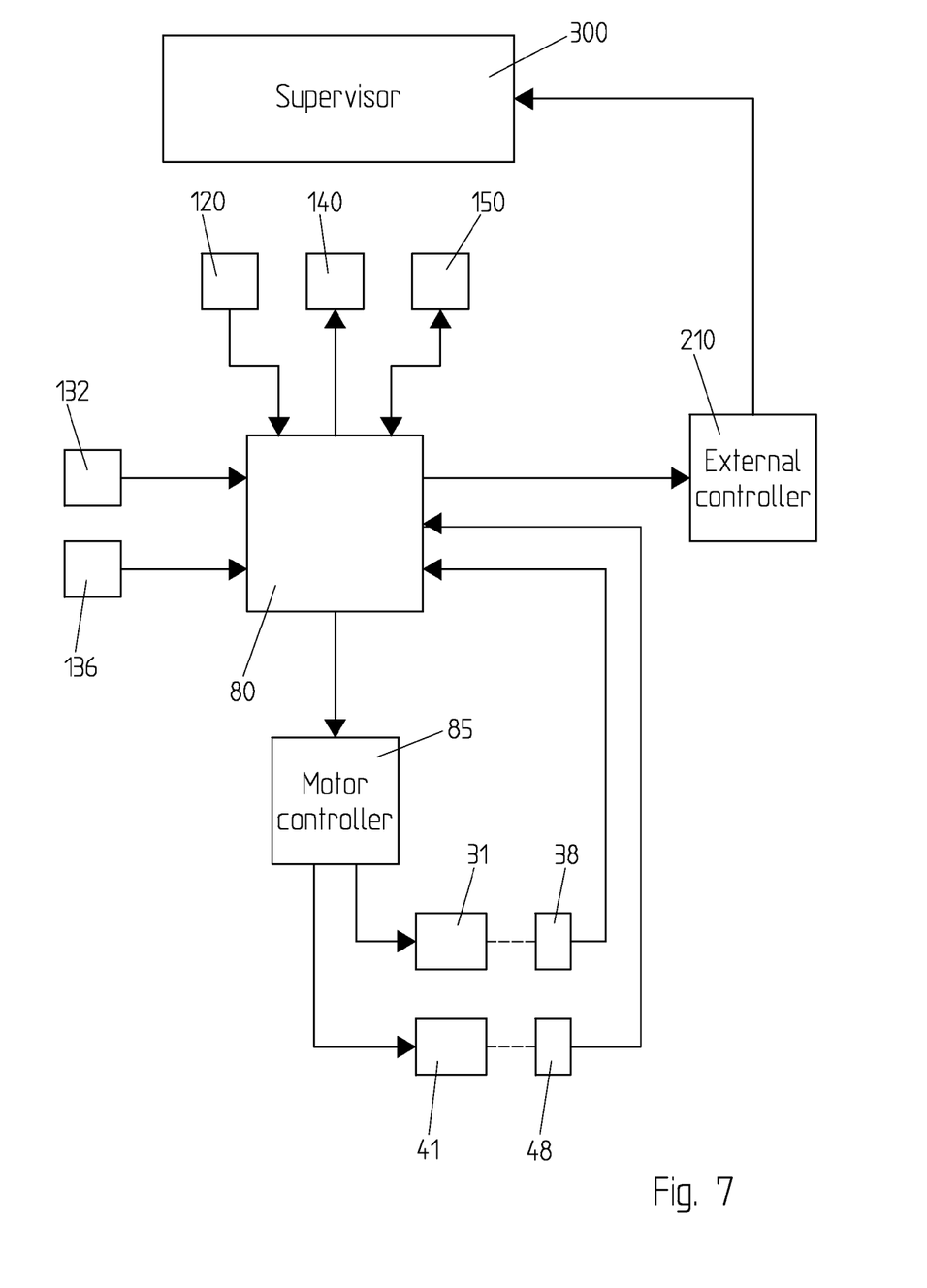
FIG. 7 illustrates schematically the relationship of an electronic control unit with elements of the articulated head according to an aspect of the invention.

FIG. 7 shows schematically the relationship of the control unit 80 with several element of the inventive wrist. The control unit 80 is connected via the data and power bus 100 to an external controller unit 210 which is in turn connected to the supervisor system of the CMM 300. Optionally the measuring head can be powered by the CMM directly, in which case the bus 100 is dedicated only to data transmission and can be realised, if appropriate and convenient, by a wireless link. The control unit 80 is in charge of controlling the motion of electric motors 31 and 41, respectively linked to the rotation axis 'B' and 'A' mentioned above, and of reading in real time the values provided by the relative encoders 38 and 39. The commands given to the motors 31, 41 are processed by a suitable motor controller 85 that generate the power signals required to operate the motors with the desired speed.

The programmable control unit 80 receives the digitized signals of the position encoders 38, 48 and commands the motors accordingly to position the two axes precisely according to the position instructions it receives. The PCU can be programmed to take into account the orientation of the wrist in space and of the external load attached in order to adapt the torque applied by the motors. In particular, the orientation of the wrist can be provided by an accelerometer 132 and/or a gyroscope 136 included in the measuring head. The integration of the PCU in the probe head provides faster reaction times in the control cycles as well as higher precision in positioning.

Preferably the control unit 80 implements an adaptive dynamic model of the articulated head and of the tool, taking the mass and inertia of the measuring tool and the orientation of the measuring head in space into account, in order to control precisely the motion of the rotors 30 and 50 from one indexed position to another according to predetermined speed profiles. Preferably, the control unit 80 is arranged to measure instantaneous gravity and dynamic forces form the accelerometer 132, and derive the dynamic from the instantaneous current drawn by the motors at the start of a motion cycle, and apply dynamic compensations to the dynamic model dependent from these quantities. In this manner the variations in the orientation and acceleration of the articulated head can be accounted for.

Preferably The control unit 80 also includes two one non-volatile memory 150, for example an EEPROM, which can be subdivided in several logical memory areas, for example one area for recording the operational parameters of the wrist and another area dedicated to additional calibration data needed for precise positioning of the probe. If appropriate, the memory 150 may comprise a plurality of physical memory chips or storage devices.

As mentioned above, the probe head of the invention is equipped, when in use, with a measuring probe attached to the connector 70, for example a touch trigger probe, a scanning contact probe, or a contactless probe. Optionally, the control unit 80 is also arranged for processing the information coming from the measuring probe; it could for example detect and filter out false contacts coming from a trigger probe or add timing information thereto.

The presence of the control unit 80 and of the memory means 150 in the probe head of the invention allows a substantial reduction of the data traffic on the bus 100, and permits in some case a deferred or buffered data communication, rather than a real-time one. This allows, in a possible variant, eliminating the external intermediate controller 210 and connecting the control unit 80 directly to the supervisor system of the CMM 300 via the bus 100. In this case the measuring head is powered by the CMM and executes autonomously the positions instructions received from the CMM supervisor.

Additionally, the PCU 80 may include also one or several temperature probes 120 and optionally one or several heating elements 140, such that the temperature of the articulated head can be monitored and, optionally, controlled.

Figure 6A:
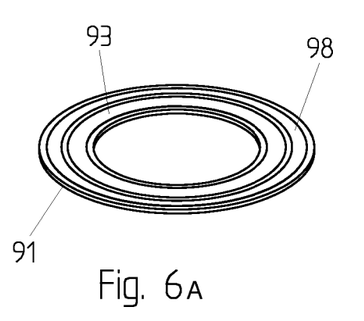
FIGS. 6A-6C illustrate schematically a capacitive crash sensor according to an aspect of the present invention.
Figure 6B:
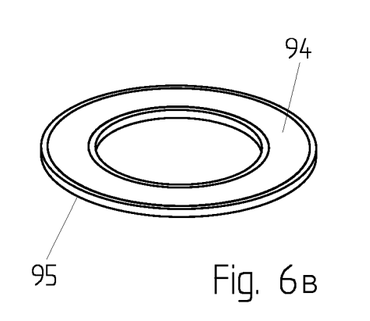
Figure 6C:
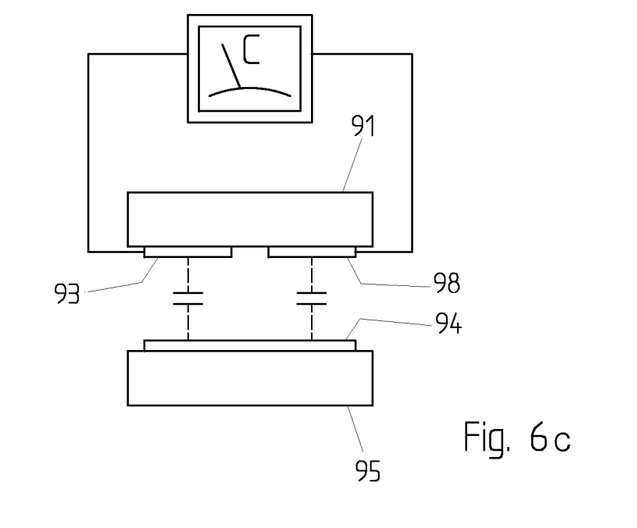

According to another important aspect of the invention, the Hirth couplings 23, 33 and 53, 43 are equipped with a capacitive sensor as represented in FIGS. 6A-6C that comprises two rings 91, 95 one attached to the support 20 and the other to the mobile element 30, which carry conductive surfaces 93, 94, 98 that are arranged so as to constitute an electric capacitor, and a capacity meter, arranged to sense when the capacity of the electric capacitor varies from a rest value.

The value of the electric capacitor is sensitive to tiny displacements of the rotor from its indexed position and is used to detect unwanted collisions of the probe head or of the measuring tool with other bodies that provoke a temporary unseating of the Hirth coupling. The data for each crash is recorded in the memory unit 150 of the PCU such that it can be read out and analysed subsequently.

REFERENCE NUMBERS

A rotation axis
B rotation axis
10 articulated head
15 connection threaded rod
20 support element
23 Hirth coupling
24 axle
25 Socket
28 Ball Bearing
29 Spring
30 first rotor
31 Motor
32 plain bearing
33 Hirth coupling
34 plain bearing
35 pull-rod
36 motor support
37 sliding pin
38 encoder
39 Plug
40 Lever
41 Motor
42 plain bearing
43 Hirth coupling
44 plain bearing
45 pull-rod
46 motor support
48 encoder
49 Plug
50 second rotor
53 Hirth coupling
54 Axle
55 socket
59 spring
70 connector
80 electronic control unit
85 motor controller
91 upper element of the crash detector
93 conductive track of the upper element
94 conductive track of the lower element
95 lower element of the crash detector
98 conductive track of the upper element
100 Power and/or data bus
120 temperature probe
132 accelerometer
136 gyroscope
140 heater
150 EEPROM
210 external controller
300 CMM supervisor

The invention claimed is:

1. An articulated measuring head for orienting a probe relatively to a measuring apparatus, including:
   a support element;
   a first mobile element rotatably connected to said support element and capable of turning around a first rotation axis relative to said support;
   a plurality of mobile positioning elements united with said first mobile element;
   a plurality of fixed positioning elements united with said support element and capable of engaging with said mobile positioning elements to define a plurality of predetermined orientations of said first mobile element relatively to said fixed element, said first fixed position element being essentially arranged in a positioning plane;
   an automatic actuator capable of being in a locked state and in an unlocked state, arranged to exert a unlocking force onto said first mobile element to move said first mobile element away from said support element and allow the rotation around said first axis when said actuator is in the unlocked state; and a locking force on said first mobile element to tighten said first mobile element against the support element and prevent the rotation around said first axis when said actuator is in the locked state;
   a first encoder arranged to determine an angular position of said first mobile element relative to said support element; and
   an electronic control unit for controlling said rotation actuators dependent from outputs of said first encoder including a first bearing and a second hearing for guiding said first mobile element relative to said first support, the first bearing being closer to the positioning plane than the second bearing, the second bearing having a higher play than the first bearing.

2. The articulated measuring head of claim 1, the first bearing having essentially the same play when the actuator is in the locked state and when it is in the unlocked state, the second bearing having a higher play when the actuator is in the locked state than when it is in the unlocked state.

3. The articulated measuring head of claim 2, including a rigid rod one end whereof is fastened in articulated manner to said first mobile element and another end whereof is fastened in articulated manner to said automatic actuator to transmit said locking force and said unlocking force.

4. The articulated measuring head of claim 1, including a rigid rod one end whereof is fastened in articulated manner to said first mobile element and another end whereof is fastened in articulated manner to said automatic actuator to transmit said locking force and said unlocking force.

5. The articulated measuring head of claim 4, wherein said automatic actuator includes an electric motor and a lever having one arm articulated with one end of said rigid rod and wherein said motor electric motor is arranged to make said lever oscillate between a locked position and an unlocked position.

6. The articulated measuring head of claim 1, wherein said automatic actuator includes an electric motor and a lever having one arm articulated with one end of said rigid rod and wherein said motor electric motor is arranged to make said lever oscillate between a locked position and an unlocked position.

7. The articulated measuring head of claim 1, further comprising:
   a second mobile element connected with said first mobile element so as to be capable of turning around a second axis relative to said first mobile element; and
   a second encoder arranged to determine an angular position of said second mobile element relative to first mobile element;
   wherein said automatic actuator is arranged to exert:
      a locking force on said second mobile element to move said second mobile element away from said first mobile element and allow the rotation around said second axis when said actuator is in the unlocked state; and
      a locking force to engage the second mobile element with the first mobile element when said actuator is in the locked state,
   said electronic control unit being arranged for controlling said rotation actuators dependent from outputs of said first encoder and of said second encoder.

8. The measuring head of claim 7, including one or more than one rotation actuators for turning said first mobile element relative to said support and/or said second mobile element relative to said first mobile element.

9. The measuring head of claim 1, including one or more than one rotation actuators for turning said first mobile element relative to said support and/or said second mobile element relative to said first mobile element.

10. The measuring head of one claim 1, further comprising a crash detection system arranged in proximity to said positioning plane.

11. The measuring head of claim 10, wherein the crash detection system comprises an electric capacitor having two elements with conductive surfaces, one of them attached to the support and the other to the mobile element and a capacity sensor, arranged to sense when the capacity of the electric capacitor varies from a rest value.

12. The measuring head of claim 11, wherein the elements of the electric capacitor are two rings parallel to said position plane.

* * * * *